United States Patent [19]

Hasegawa

[11] 4,095,489
[45] Jun. 20, 1978

[54] INDEX APPARATUS FOR MACHINE TOOL
[75] Inventor: Toshifumi Hasegawa, Kariya, Japan
[73] Assignee: Toyoda-Koki Kabushiki-Kaisha, Japan
[21] Appl. No.: 788,085
[22] Filed: Apr. 15, 1977
[51] Int. Cl.² ............................................. B23B 29/32
[52] U.S. Cl. ................... 74/820; 74/813 L; 74/826; 29/48.5 A; 408/35; 82/36 A
[58] Field of Search ............... 74/820, 813 L, 813 R, 74/826; 90/56 R, 56 A; 408/35; 29/39, 48.5 A, 46; 82/36 A

[56] References Cited
U.S. PATENT DOCUMENTS

| 3,545,317 | 12/1970 | Shultz | 74/826 X |
| 3,572,194 | 3/1971 | Cafolla | 74/826 X |
| 3,888,140 | 6/1975 | Mackelvie | 74/826 |
| 3,999,264 | 12/1976 | Carmen | 74/826 X |

Primary Examiner—Alan Cohan
Attorney, Agent, or Firm—Oblon, Fisher, Spivak, McClelland & Maier

[57] ABSTRACT

A vertical support shaft supporting a tool support is slidably and rotatably supported in a base. A gear member is rotatably but non-slidably mounted on the support shaft and is provided with a threaded portion threadedly engaged with the base. A sleeve member having a rack engaging with the gear member is moved axially to lift the tool support to an upper position for an index operation. The sleeve member is provided with a notch to receive a resiliently urged lock shaft for restraining the axial movement of the sleeve member when the tool support is moved to the upper position.

4 Claims, 4 Drawing Figures

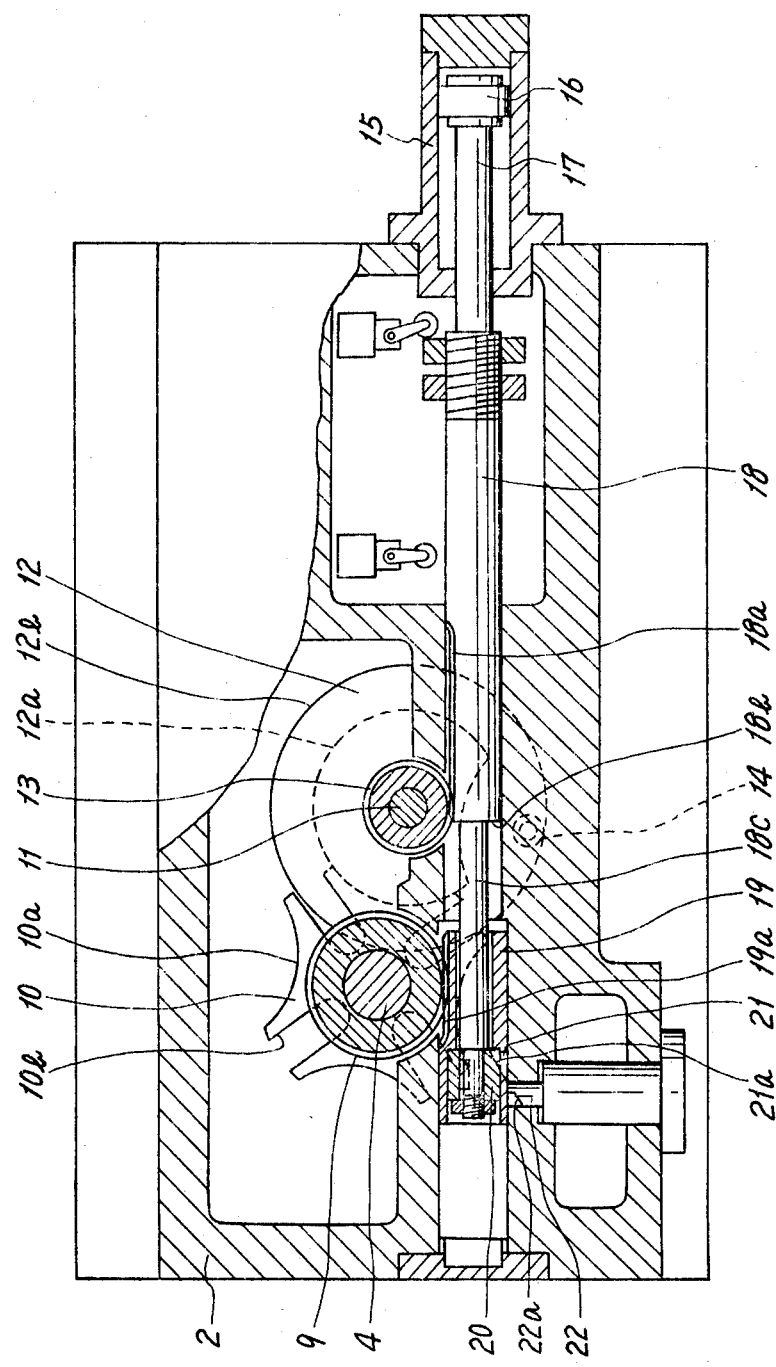

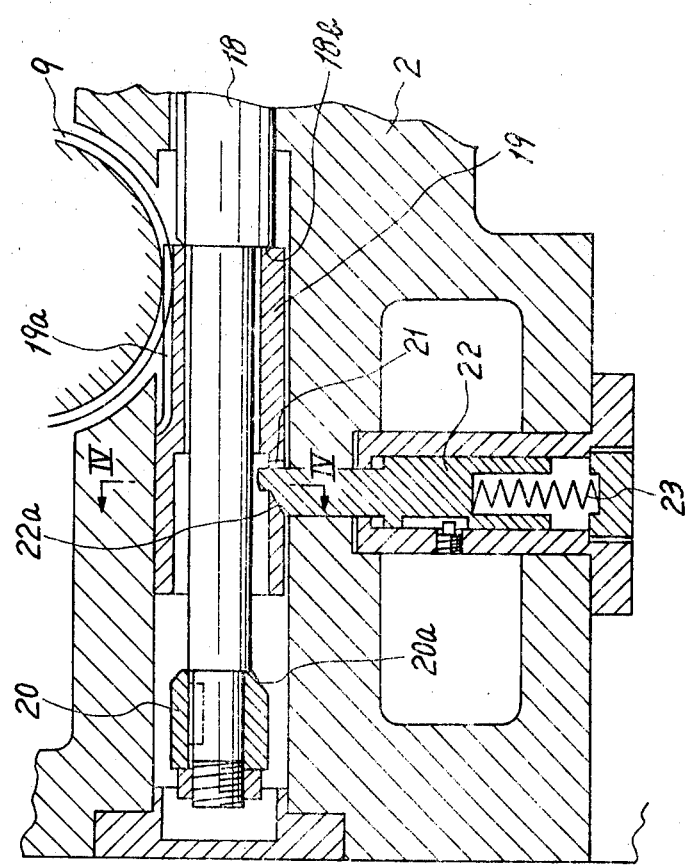
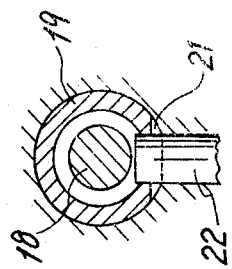

INDEX APPARATUS FOR MACHINE TOOL

BACKGROUND OF THE INVENTION

1. Field of the Invention

The present invention relates to an index apparatus for indexing to a predetermined operative position each of a plurality of tools carried on a tool support of a machine tool.

2. Description of the Prior Art

A conventional index apparatus is provided with a pair of gear couplings for indexing a tool support carrying a plurality of tools. In such an index apparatus, the tool support has to be lifted before the indexing operation. For this reason, a vertical shaft carrying the tool support is slidably and rotatably supported in a base. A gear member is rotatably but non-slidably mounted on the support shaft and is provided with a threaded portion threadedly engaged with the base. A sleeve member having a rack engaging with the gear member is moved axially to lift the tool support for the indexing operation. However, when the tool support carries heavy tools, the sleeve member may be moved axially during the indexing operation to thereby move the tool support downward, which results in inaccurate indexing of the tool support.

SUMMARY OF THE INVENTION

It is an object of the present invention to provide a new and improved index apparatus for a machine tool of the character described herein which is capable of preventing the tool support from being moved downward during the indexing operation.

Another object of the present invention is to provide a new and improved index apparatus of the character described herein, wherein the sleeve member is restrained from moving axially when the tool support is moved to its upper position, even when the tool support is carrying heavy tools.

Briefly, according to the present invention, these and other objects are achieved by providing an index apparatus for a machine tool which comprises a base, a vertical support shaft slidably and rotatably supported in the base, a tool support carrying a plurality of tools and fixedly supported on the upper end of the support shaft, a first gear coupling fixedly mounted on the base, a second gear coupling provided at the underside of the tool support and engaged with the first gear coupling when the tool support is located at a lower position thereof, a first gear member rotatably but non-slidably mounted on the support shaft and provided with a threaded portion threadedly engaged with the base, means for indexing the tool support when positioned at an upper position thereof, an operating shaft slidably received in the base, a sleeve member slidably received in the base and provided with a notch and connected to the operating shaft to be movable relative thereto a predetermined distance, a first rack formed on the sleeve member and engaged with the first gear member, means for moving the operating shaft through a distance larger than the predetermined distance to move the support shaft and the tool support vertically, through the first rack and the first gear member, and to drive the indexing means, a lock shaft mounted in the base to be slidable in a direction perpendicular to the movement of the sleeve member and to be engaged with the notch of the sleeve member to restrict the axial movement of the sleeve member when the tool support is moved to the upper position thereof so as to disengage the second gear coupling from the first gear coupling, and resilient means for urging the lock shaft toward the sleeve member.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 2 is a sectional view taken along the lines II—II of FIG. 1;

FIG. 3 is an enlarged fragmentary sectional view showing different operative positions of component parts shown in FIG. 2; and FIG. 4 is a sectional view taken along the lines IV—IV of FIG. 3.

DETAILED DESCRIPTION OF THE PREFERRED EMBODIMENT

Figure 1:
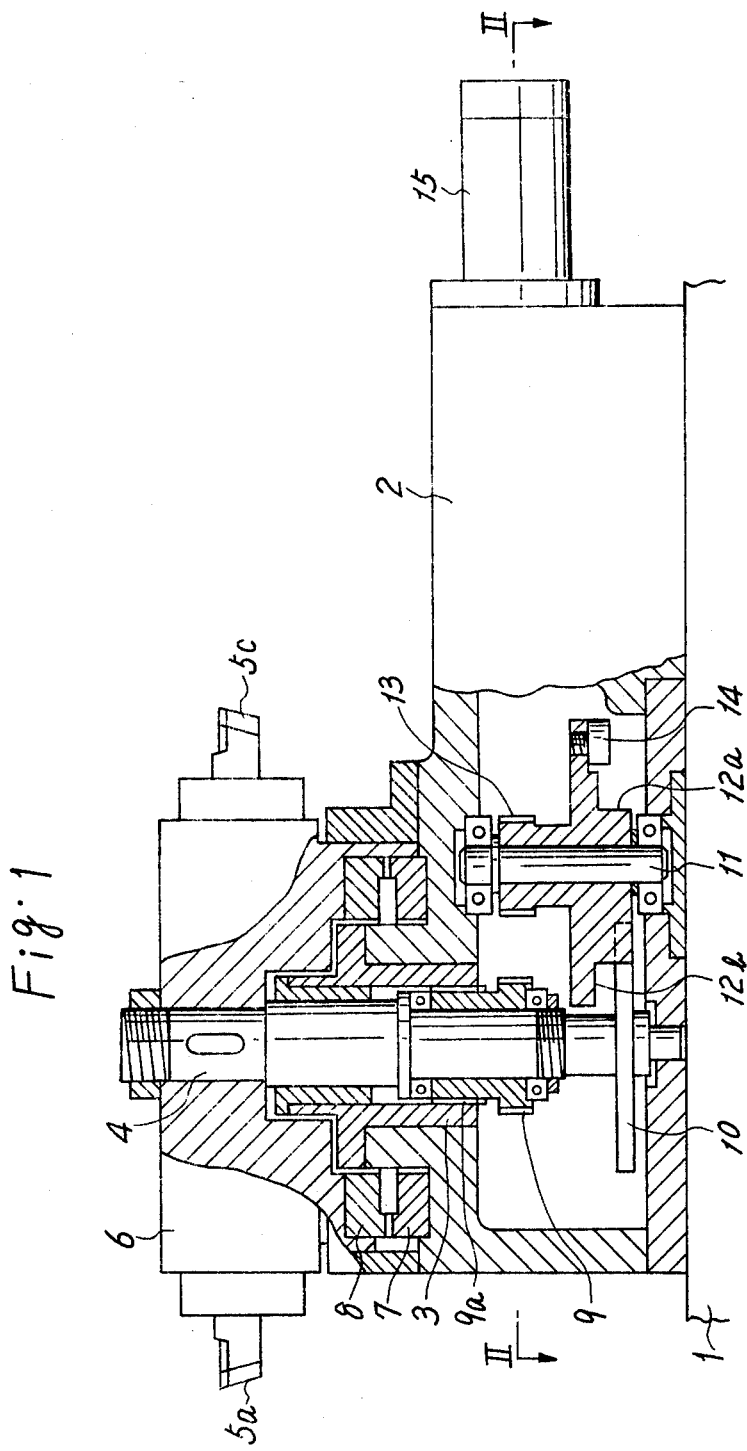
FIG. 1 is a sectional view of an index apparatus according to the present invention.

Referring now to the drawings, wherein like reference numerals or characters refer to identical or corresponding parts throughout the several views, and more particularly to FIG. 1, there is shown a saddle 1 which is slidably mounted on a bed, not shown, for a transverse movement. A base 2 is slidably mounted on the saddle 1 for a longitudinal movement. A vertical support sleeve 3 is fixedly mounted on the base 2 and a support shaft 4 is slidably and rotatably supported in the support sleeve 3. A tool support 6 carrying a plurality of tools 5a to 5d is fixedly supported on the upper end of the support shaft 4. On the top of the base 2 is fixedly mounted a gear coupling 7 which is to be engaged with a mating gear coupling 8 provided at the underside of the tool support 6 so as to index the respective tool to an operative position. In FIG. 1, the gear couplings 7 and 8 are shown in engagement with each other to index the tool 5a at the operative position. A gear member 9 is rotatably mounted on the intermediate portion of the shaft 4 and is provided at its upper end with a threaded portion 9a which is threadedly engaged with the support sleeve 3. The gear member 9 is restrained from axial movement relative to the support shaft 4. A Geneva gear 10 is splined to the lower portion of the support shaft 4. A shaft 11 is rotatably supported in the base 2 in parallel relation with the support shaft 4 and carries a disk 12 which is integrally formed with a gear 13 lying in the same horizontal plane with the gear 9. The disk 12 has a reduced portion 12a which is engaged with one of the peripheral notches 10a of the Geneva gear 10. The Geneva gear 10 is formed with a plurality of equi-spaced radial slots 10b between the respective peripheral notches 10a. A roller 14 is rotatably supported at the underside of the larger diametrical portion 12b of the disk 12 to be engageable with a respective one of the radial slots 10b of the Geneva gear 10 when the support shaft 4 is located at its upper position. When the support shaft 4 is located at its lower position and the gear couplings 7 and 8 are engaged with each other, as shown in FIG. 1, the roller 14 is located upwardly of the Geneva gear 10 and is therefore not engaged therewith, even if the disk 12 is rotated. When the support shaft 4 is shifted into its upper position, to disengage the gear couplings 7 and 8, however, the roller 14 is engageable with the Geneva gear 10.

As shown in FIG. 2, at the right end of the base 2 is secured a cylinder 15 which slidably receives a piston 16. A piston rod 17 integrally formed with the piston 16 is extended beyond the cylinder 15. An operating shaft 18 integrally formed with the piston rod 17 is slidably received in the base 2 and is formed with a rack portion 18a which is always engaged with the gear 13 of the disk 12. A sleeve member 19 is slidably received at the left end of the base 2, in coaxial relation with the operating shaft 18, and is provided with a rack portion 19a which is always engaged with the gear 9. A reduced portion 18c of the operating shaft 18 is loosely received in the sleeve member 19. The operating shaft 18 is movable to the left relative to the sleeve member 19 until a shoulder 18b thereof, between the main body thereof and its reduced portion 18c, abuts against the right end of the sleeve member 19. The sleeve member 19 is then movable to the left after the shoulder 18b is engaged with the right end of the sleeve member 19. A dog 20 is secured to the end of the reduced portion 18c, and the operating shaft 18 is movable to the right, relative to the sleeve member 19, until the dog 20 abuts against the sleeve member 19. The sleeve member 19 is then movable to the right, with the operating shaft 18, after the dog 20 abuts against the sleeve member 19.

As shown in FIGS. 3 and 4, the sleeve member 19 is provided, at a predetermined position on the periphery thereof, with a notch 21 to receive one end of a lock shaft 22. The lock shaft 22 is urged by a compression spring 23 toward the sleeve member 19. The lock shaft 22 is provided at one end thereof with an inclined surface 22a mating with an inclined surface 21a provided at the notch 21, as shown in FIGS. 2 and 3. When the sleeve member 19 is moved to the left, the lock shaft 22 is moved into the notch 21, under the influence of spring 23, to restrict the further movement of the sleeve member 19, as shown in FIG. 3. The dog 20 is also provided with an inclined surface 20a and, when the operating shaft 18 is moved to the right from the position shown in FIG. 3, the inclined surface 20a of the dog 20 urges the lock shaft 22 out of the notch 21, against the force of the compression spring 23, to permit axial movement of the sleeve member 19 to the right.

The operation of the index apparatus according to the present invention will now be described.

In order to index one of the tools 5a to 5d to the operative position, pressurized fluid is supplied to the right chamber of the cylinder 15. In accordance therewith, the operating shaft 18 is moved to the left, as viewed in FIG. 2, with the piston 16 and the piston rod 17. The leftward movement of the operating shaft 18 causes the gear 13, engaging with the rack portion 18a, and the disk 12 to rotate clockwise. Since, at this time, the support shaft 4 is located at its lower position, the roller 14 is rotated without engagement with a radial slot 10b of the Geneva gear 10. The sleeve member 19 remains unmoved until the shoulder portion 18b of the operating shaft 18 abuts against the right end of the sleeve member 19. Further movement of the operating shaft 18 to the left causes the sleeve member 19 to move therewith. Leftward movement of the sleeve member 19 causes the gear 9, engaging with the rack portion 19a, to rotate clockwise. The gear member 9, which is threadedly engaged with the support sleeve 3 at the threaded portion 9a thereof, is shifted upward during the rotation thereof. In accordance therewith, the support shaft 4 and the tool support 6 are lifted to the upper position to disengage the gear coupling 8 from the gear coupling 7. When the support shaft 4 is lifted to its upper position, the Geneva gear 10 is located at the position where one of the radial slots 10b thereof is engageable with the roller 14. At this time, the sleeve member 19 is at a position where the lock shaft 22 is moved into the notch 21 of the sleeve member 19 to restrict the further movement of the sleeve member.

When the piston 16 is moved to the leftward end thereof, pressurized fluid is supplied to the left chamber of the cylinder 15 to move the piston 16 to the right. In accordance therewith, the operating shaft 18 is retracted, to rotate the gear 13 and the disk 12 counterclockwise. Counterclockwise rotation of the disk 12 causes the roller 14 to engage with a radial slot 10b to rotate the Geneva gear 10 counterclockwise. Accordingly, the support shaft 4 and the tool support 6 are rotated through 90°. During the rotation of the support shaft 4 and the tool support 6, the sleeve member 19 is restrained, by the engagement between the inclined surfaces 21a and 22a, from axial rightward movement without being affected by the rotation of the support shaft 4, which provides a positive indexing operation. When the roller 14 is disengaged from the radial slot 10b, by further counterclockwise rotation of the disk 12, the tool support 6 is stopped with a new tool being indexed at the operative position. At this time, the inclined surface 20a of the dog 20 is engaged with the lock shaft 22 to retract the same away from the notch, against the force of the spring 23. Further movement of the piston 16 to the right causes the dog 20 to abut against the sleeve member 19, to move the same therewith. Movement of the sleeve member 19 to the right thus causes the lock shaft 22 to disengage from the notch 21 and to be maintained engaged with the underside of the sleeve member 19. Furthermore, movement of the sleeve member 19 causes the gear 9 to rotate counterclockwise. The gear 9 is therefore moved downward relative to the support sleeve 3, by rotation thereof. Accordingly, the support shaft 4 and the tool support 6 are moved downward to engage the gear coupling 8 with the gear coupling 7. The tool support is thereby firmly clamped on the base by pressurized fluid supplied in the left chamber of the cylinder 15.

Obviously, numerous modifications and variations of the present invention are possible in light of the above teachings. It is to be understood therefore that within the scope of the appended claims, the invention may be practiced otherwise than as specifically described herein.

What is claimed as new and desired to be secured by Letters Patent of the United States is:

1. An index apparatus for a machine tool comprising:
   a base;
   a vertical support shaft slidably and rotatably supported in said base;
   a tool support carrying a plurality of tools and fixedly supported on the upper end of said support shaft;
   a first gear coupling fixedly mounted on said base;
   a second gear coupling provided at the underside of said tool support and engaged with said first gear coupling when said tool support is located at a lower position thereof;
   a first gear member rotatably but non-slidably mounted on said support shaft and provided with a threaded portion threadedly engaged with said base;

means for indexing said tool support positioned at an upper position thereof;

an operating shaft slidably received in said base;

a sleeve member slidably received in said base and provided with a notch and connected to said operating shaft to be movable relative thereto a predetermined distance;

a first rack formed on said sleeve member and engaged with said first gear member;

means for moving said operating shaft a distance larger than said predetermined distance to move said support shaft and said tool support vertically, through said first rack and said first gear member, and to drive said indexing means;

a lock shaft mounted in said base to be slidable in a direction perpendicular to the movement of said sleeve member and to be engaged with the notch of said sleeve member, to restrict axial movement of said sleeve member when said tool support is moved to the upper position thereof, so as to disengage said second gear coupling from said first gear coupling; and resilient means for urging said lock shaft toward said sleeve member.

2. An index apparatus as set forth in claim 1, wherein said indexing means comprises:

a Geneva gear fixedly secured to the lower end of said support shaft and provided with a plurality of equi-spaced radial slots;

a shaft rotatably supported in said base in parallel relation with said Geneva gear and carrying a disk thereon;

a roller rotatably supported by said disk to be engageable with one of the radial slots of said Geneva gear when said tool support is located at said upper position;

a second gear member integrally formed with said disk; and a second rack formed on said operating shaft and engaged with said second gear member.

3. An index apparatus as set forth in claim 1, wherein said lock shaft is provided with an inclined surface, mating with an inclined surface provided at the notch of said sleeve member, so as to restrain axial movement of said sleeve member.

4. An index apparatus as set forth in claim 1, wherein said operating shaft is provided with a reduced portion which is loosely received in said sleeve member, and further comprising a dog secured to the end of said reduced portion and provided with an inclined surface to urge said lock shaft out of the notch, against the biasing force of said resilient menas, to permit axial movement of said sleeve member.

* * * * *